United States Patent
Alfonso Alegre et al.

(10) Patent No.: US 8,648,168 B2
(45) Date of Patent: Feb. 11, 2014

(54) BIODEGRADABLE POLYESTERETHERAMIDE

(71) Applicant: Sociedad Anónima Minera Catalano Aragonesa, Saragossa (ES)

(72) Inventors: Maria José Alfonso Alegre, Saragossa (ES); Patricia Zagalaz Lasierra, Saragossa (ES); Miguel Ángel Caballero López, Saragossa (ES)

(73) Assignee: Sociedad Anonima Minera Catalano Aragonesa, Saragossa (ES)

( * ) Notice: Subject to any disclaimer, the term of this patent is extended or adjusted under 35 U.S.C. 154(b) by 0 days.

(21) Appl. No.: 13/758,517

(22) Filed: Feb. 4, 2013

(65) Prior Publication Data

US 2013/0217852 A1 Aug. 22, 2013

(30) Foreign Application Priority Data

Feb. 17, 2012 (EP) .................................... 12001068

(51) Int. Cl.
*C08G 64/00* (2006.01)
*C08G 63/02* (2006.01)

(52) U.S. Cl.
USPC ............................ 528/332; 528/335; 528/336

(58) Field of Classification Search
USPC ......................................... 528/332, 335, 336
See application file for complete search history.

(56) References Cited

U.S. PATENT DOCUMENTS

| | | | | |
|---|---|---|---|---|
| 5,254,668 | A * | 10/1993 | Dominguez et al. | 528/323 |
| 5,880,220 | A * | 3/1999 | Warzelhan et al. | 525/424 |
| 5,889,135 | A | 3/1999 | Warzelhan et al. | |
| 6,590,065 | B1 * | 7/2003 | Goldfinger | 528/310 |
| 2011/0034662 | A1 | 2/2011 | Witt et al. | |
| 2011/0039999 | A1 | 2/2011 | Witt et al. | |

* cited by examiner

*Primary Examiner* — Terressa Boykin
(74) *Attorney, Agent, or Firm* — Notaro, Michalos & Zaccaria P.C.

(57) ABSTRACT

A biodegradable polyesteretheramide for manufacturing films and molded products, for example for application in the protection of foodstuff products and films for agriculture, contains a compound with at least 3 groups capable of reacting with one or several types of the active groups present in the reaction mixture, that is, compounds which, while containing ether groups in their structure, have active groups capable of reacting in the reaction mixture to form amide groups, and which simplifies and shortens the preparation process, reducing its economic cost and obtaining products of greater transparency and higher strain at failure, while maintaining other properties such as resistance to tearing and puncture, and allowing greater widths of films to be made with smaller thicknesses.

15 Claims, No Drawings

BIODEGRADABLE POLYESTERETHERAMIDE

This descriptive report refers, as the title indicates, to a biodegradable polyesteretheramide of the kind used in making films and moulded products, for example for application in the protection of foodstuff products and films for agriculture, wherein it contains a compound with at least 3 groups capable of reacting with one or several types of the active groups present in the reaction mixture, that is, compounds which, while containing ether groups in their structure, have active groups capable of reacting in the reaction mixture to form amide groups.

The term biodegradable refers to the fact that polyesteretheramide decomposes under environmental influences within a reasonable time, generally through hydrolytic and/or oxidative degradation, by enzymatic degradation or under the influence of microorganisms such as bacteria, yeast, fungi and algae. Specifically, polyester amide presents at least 90% biodegradability under the conditions specified in the DIN EN13432 standard. There are other methods for determining biodegradability such as ASTM D5338 and ASTM D6400.

At the present time, there are many, varied types of polymers which are widely known to be biodegradable, for instance those described in U.S. Pat. No. 5,889,135 "Biodegradable polymers, process for producing them and their use in preparing biodegradable moulded bodies", which presents a polyester that uses a compound D with at least three groups capable of forming esters, to which hydroxycarboxylic acid B1 is added in a reaction process of a mixture a1 and a compound a2 that react in the presence of a compound D. These polymers have the drawback of involving a long, complex production process with a fairly high economic cost, and also that the strain at failure and transparency are fairly improvable.

We also find other polymers such as that claimed in U.S. Pat. No. 6,120,895 "Biodegradable polyesters", which presents a polyester based on a polyester A comprising a1 and a2 and on a mixture B formed by compounds b1, b2, b3, b4 (compounds capable of reacting with the polyester A and all at a % higher than 0) to improve the processing and the product properties.

As in the previous case, this polyester has the drawback of involving a rather long, complex production process with a large number of integrating compounds and a high economic cost, and its strain at failure and transparency are not very good either.

In the same way, we can find some processes, such as that described in US Patent 2011/0039999 "Method for continuous production of biodegradable polyesters" which describes a process for the continuous production of a biodegradable polyester which includes glycerol but not polyethertriamine, or in US Patent 2011/0034662 "Method for continuous production of biodegradable polyesters" which also claims a continuous production process of a biodegradable polyester which includes a compound with 3 or more functional groups but without enabling the specific use of a polyethertriamine.

To solve the present problem of biodegradable polymers for films and moulded products in an attempt to improve the present state of the art by simplifying the production process, by reducing the integral components and by improving the characteristics of the final product, the biodegradable polyesteretheramide that is the object of this invention was conceived, which contains the following in suitable proportions, an organic compound 1 with at least one aromatic or furan ring and two or more acid groups, an aliphatic or cycloaliphatic organic compound 2 with two or more acid groups, an aliphatic, cycloaliphatic or aromatic organic compound 3 with at least one alcohol group, an organic compound 4 containing sulphonic groups, a compound 5 with at least 3 groups capable of reacting with one or several types of the active groups present in the reaction mixture, that is, compounds which, while containing ether groups in their structure, have active groups capable of reacting in the reaction mixture to form amide groups, a compound 6 with at least 2 groups capable of reacting with the polyesteretheramide, an aliphatic, cycloaliphatic or aromatic organic compound 7 with groups capable of forming amide bonds or esters in the reaction mixture, and a compound 8 acting as a catalyst.

This presented biodegradable polyesteretheramide has many advantages over the biodegradable polymers currently available, the most important of which is that the number of compounds used in the preparation process is reduced, thus significantly simplifying the process and therefore making it cheaper, which results in a less expensive end product.

Another important advantage is that the product is a biodegradable polyesteretheramide instead of a biodegradable polyester obtained conventionally, which extends the range of products industrially available.

It is important to stress that this biodegradable polyesteretheramide enables similar products to be obtained, such as films, injection parts, etc. . . . , but with better properties. Specifically, for the same thickness, the films prepared with this biodegradable polyesteretheramide have greater strain at failure, up to 50% higher, while maintaining other properties such as resistance to tearing and puncture. This greater elongation will enable wider widths and smaller thicknesses to be achieved in films made with the polymer or with its mixtures with starch.

Another important advantage to highlight is that the films made with this biodegradable polyesteretheramide are more transparent, with 20% less turbidity, which is a property that is very much appreciated in films, especially films used in packing foodstuffs.

The biodegradable polyesteretheramide that is the object of this invention contains the following in an example of preferred embodiment:

from 5 to 80 mol % with respect to the sum of moles of compound 1+2, of an organic compound 1 with at least one aromatic or furan ring and two or more acid groups, their esters or anhydrides, or mixtures thereof, including under this designation both compounds obtained from petroleum and from natural sources.

from 20 to 95 mol % with respect to the sum of moles of compound 1+2, of an aliphatic or cycloaliphatic organic compound 2 with two or more acid groups, their esters or anhydrides, or mixtures thereof, including under this designation both compounds obtained from petroleum and from natural sources.

from 20 to 300 mol %, with respect to the sum of moles of compound 1+2, of an aliphatic, cycloaliphatic or aromatic organic compound 3 with at least one alcohol group, including the polyols, amino alcohol, carboxyl alcohol, and furans; these might contain ether groups in their structure or mixtures of all of the mentioned compounds, including under this designation both compounds obtained from petroleum and from natural sources.

from 0 to 2 mol %, with respect to the sum of compound 1+2+4, of an organic compound 4 containing sulphonic groups, including under this designation both compounds obtained from petroleum and from natural sources.

from 0.02 to 5 mol %, with respect to the sum of moles of compound 1+2, of a compound 5 with at least 3 groups capable of reacting with one or several types of the active groups present in the reaction mixture, that is, any compound that is capable of reacting with the carboxyl or alcohol or furan or amino or ester or amide or ether groups, in particular compounds which, while containing ether groups in their structure, have active groups capable of reacting in the reaction mixture to form amide groups, including under this designation both compounds obtained from petroleum and from natural sources.

from 0 to 10% by weight with respect to the weight of the polyesteretheramide obtained from compound 1+2+3+4+5, of a compound 6 with at least 2 groups capable of reacting with the polyesteretheramide, including under this designation both compounds obtained from petroleum and from natural sources.

from 0% to 95 mol %, with respect to the sum of moles of compound 1+2, of an aliphatic, cycloaliphatic or aromatic organic compound 7 with groups capable of forming amide bonds or esters in the reaction mixture, including under this designation both compounds obtained from petroleum and from natural sources.

and from 0 to 5% by weight with respect to the polyester amide, of a compound 8 acting as a catalyst.

Compound 1 belongs to the group formed by: terephthalic acid, isophthalic acid, 2,6-naphthalic acid, 1,5-naphthalic acid, furanodicarboxylic acid (FDCA), esters derived from the above acids such as dimethyl, diethyl, di-n-propyl, diisopropyl, di-n-butyl, diisobutyl, di-t-butyl, di-n-pentyl, diisopentyl and di-n-hexyl ester, including under this designation both compounds obtained from petroleum and from natural sources.

Compound 2 belongs to the group formed by: malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, 2,5-norbornanedicarboxylic acid, C36-diacid and the esters derived from these compounds, including under this designation both compounds obtained from petroleum and from natural sources.

Compound 3 belongs to the group formed by: alkanediols, cyclolalkanediols, ethylene glycol; 1,2 and 1,3 propanediol; 1,2 and 1,4-butanediol; 1,5-pentanediol or 1,6 hexanediol; cyclopentanodiol; 1,4 cyclohexanediol; 1,2-cyclohexanedimethanol; 1,4-cyclohexanedimethanol; diethylene glycol, triethylene glycol, polyethylene glycol, polypropylene, glycol, polytetrahydrofuran, polyethylene glycol, 4-aminomethylcyclohexanemethanol, 2-aminoethanol, 3-aminopropanol, 4-aminobutanol, 5-aminopentanol, 6-aminohexanol, aminocyclopentanol, aminocyclohexanol, and mixtures thereof, including under this designation both compounds obtained from petroleum and from natural sources.

Compound 4 belongs to the group formed by: alkali or alkaline-earth metals salts from diacids containing sulphonic groups or the derived esters or their mixtures, including under this designation both compounds obtained from petroleum and from natural sources.

Compound 5 is formed by at least 3 groups of the following: carboxyl, alcohol, furan, amino, ester, amide, anhydride, epoxy, isocyanates, carbodiimides, carbonyl bis caprolactam, oxazolines, etc., including under this designation both compounds obtained from petroleum and from natural sources, in particular compounds which, while containing ether groups in their structure, have active groups capable of reacting in the reaction mixture to form amide groups. Alternatively, compound 5 may be a polyether amine with at least 3 amino groups capable of reacting with one or several types of the active groups present in the reaction mixture.

Compound 6 is formed by elements of the group of: isocyanates, carbonyl bis caprolactam, oxazolines, epoxy, carbodiimides, anhydride, etc., including under this designation both compounds obtained from petroleum and from natural sources.

Compound 7 belongs to the group formed by: diacids, diols, hydroxycarboxylic acids (such as caprolactone), compounds with at least 2 amino groups, amino alcohols (such as ethanol amide, propanolamine . . . ) and cyclic lactams (ϵ-caprolactam, lauryl lactam . . . ), amino acids (such as aminocaproic acid), including under this designation both compounds obtained from petroleum and from natural sources.

Compound 8 is also group formed by: compounds with metals such as Ti, Ge, Zn, Fe, Mn, Co, Zr, V, Ir, La, Ce, Li and Ca, Sb, organometallic compounds based on these metals, such as organic acid salts, alkoxides, acetylacetones.

Biodegradable polyesteretheramide obtained in this way contains from 0.5 to 10% by weight of polyether amide and from 99.5 to 90% by weight of polyester.

This biodegradable polyesteretheramide has a characteristic production procedure that includes several sequential stages in each of which all, some or none of the above compounds are totally or partially added:

Stage 1: temperature adjustment to eliminate the reaction by-products with lower boiling points. The necessary compounds are loaded and a temperature within a range from 150 to 210° C. is set inside the reactor, and a pressure of 1000-4000 mbar, to enable the removal of volatile products through a distillation column. The stage finishes when the temperature at the column head drops below 65° C.

Stage 2: temperature adjustment to eliminate the reaction by-products with higher boiling points. The necessary compounds are loaded at atmospheric pressure and a temperature within a range from 150 to 210° C. is set inside the reactor, and a pressure of 1000-4000 mbar, to enable the removal of volatile products through a distillation column. The stage finishes when the temperature at the column head drops below 100° C.

Stage 3: elimination of the surplus of compound 3, for which the temperature is increased and the pressure decreased. The gas outlet is closed, the necessary components are loaded and the temperature is increased to achieve 210-270° C. in the product and a vacuum is initiated by progressively dropping the pressure until it falls below 5 mbar.

Stage 4: the pressure is dropped to achieve a high vacuum to enhance chain growth until a number average molecular weight (Mn) of between 5000 and 100000 g/mol is achieved. The vacuum achieved in stage 3 is maintained until the required Mn is reached.

Stage 5 in which compound 6 is finally added to the polymer obtained in stage 4 to achieve greater Mn values. This stage may be carried out in the same equipment, adding the melted compound to a mixer incorporated in the line following stage 4, or in a later processing of the pellets obtained in stage 4 using one of the following processes: compounding, injection, extrusion or physical mixture.

The preferred use of this biodegradable polyesteretheramide is in manufacturing protective films and moulded containers particularly for the foodstuff industry and for agriculture, both alone and with other products to produce biodegradable mixtures, which may, in addition to the polyester amide, also contain: aliphatic polyesters, aliphatic-aromatic polyesters, starch, polycaprolactone, cellulose, polyhydroxyalkanoates, polylactic acid, etc

The invention claimed is:

1. A biodegradable polyesteretheramide comprising:
   from 5 to 80 mol % with respect to the sum of moles of compound 1+2 of an organic compound 1 with at least one aromatic or furan ring and two or more acid groups, their esters or anhydrides, or mixtures thereof, including under this designation compounds obtained either from petroleum or from natural sources;
   from 20 to 95 mol % with respect to the sum of moles of compound 1+2 of an aliphatic or cycloaliphatic organic compound 2 with two or more acid groups, their esters or anhydrides, or mixtures thereof, including under this designation compounds obtained either from petroleum or from natural sources;
   from 20 to 300 mol % with respect to the sum of moles of compound 1+2 of an aliphatic, cycloaliphatic or aromatic organic compound 3 with at least one alcohol group, including under this designation polyols, amino alcohol, carboxyl alcohol and furans, being able to contain in its structure ether groups or mixtures of all of the mentioned compounds, including under this designation compounds obtained either from petroleum or from natural sources;
   from 0 to 2 mol % with respect to the sum of compounds 1+2, of an organic compound 4 containing sulphonic groups, including under this designation compounds obtained either from petroleum or from natural sources;
   from 0.02 to 5 mol % with respect to the sum of moles of compound 1+2 of a compound 5 with at least 3 groups capable of reacting with one or several types of the active groups present in the reaction mixture, that is, compounds which, while containing ether groups in their structure, have at least three active groups capable of reacting in the reaction mixture to form amide groups, including under this designation compounds obtained either from petroleum or from natural sources;
   from 0 to 10% by weight with respect to the weight of the polyesteretheramide obtained from the compound 1+2+3+4+5 of a compound 6 with at least 2 groups capable of reacting with the polyesteretheramide, including under this designation compounds obtained either from petroleum or from natural sources;
   from 0 to 95 mol % with respect to the sum of moles of compound 1+2 of an aliphatic, cycloaliphatic or aromatic organic compound 7 with groups capable of forming amide bonds or esters in the reaction mixture, including under this designation compounds obtained either from petroleum or from natural sources;
   and
   from 0 to 5% by weight with respect to the polyesteretheramide, of a compound 8 acting as a catalyst.

2. The biodegradable polyesteretheramide according to claim 1, wherein compound 1 belongs to the group formed by: terephthalic acid, isophthalic acid, 2,6-naphthalic acid, 1,5-naphthalic acid, furanodicarboxylic acid (FDCA), esters derived from the above-mentioned acids such as dimethyl, diethyl, di-n-propyl, diisopropyl, di-n-butyl, diisobutyl, di-t-butyl, di-n-pentyl, diisopentyl and di-n-hexyl ester, including under this designation compounds obtained either from petroleum or from natural sources.

3. The biodegradable polyesteretheramide according to claim 1, wherein compound 2 belongs to the group formed by: malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, 2,5-norbornanedicarboxylic acid, C36-diacid and the esters derived from these compounds, including under this designation compounds obtained either from petroleum or from natural sources.

4. The biodegradable polyesteretheramide according to claim 1, wherein compound 3 belongs to the group formed by: alkanediols, cycloalkanediols, ethylene glycol; 1,2 and 1,3 propanediol; 1,2 and 1,4-butanediol; 1,5-pentanediol or 1,6 hexanediol; cyclopentanediol; 1,4 cyclohexanediol; 1,2-cyclohexanedimethanol; 1,4-cyclohexanedimethanol; diethylene glycol, triethylene glycol, polyethylene glycol, polypropylene, glycol, polytetrahydrofuran, polyethylene glycol, 4-aminomethylcyclohexanemethanol, 2-aminoethanol, 3-aminopropanol, 4-aminobutanol, 5-aminopentanol, 6-aminohexanol, aminocyclopentanoyl, aminocyclohexanol, and mixtures thereof, including under this designation compounds obtained either from petroleum or from natural sources.

5. The biodegradable polyesteretheramide according to claim 1, wherein compound 4 belongs to the group formed by: alkali metal or alkaline-earth metal salts from diacids containing sulphonic groups or the derived esters or their mixtures, including under this designation compounds obtained from either petroleum or from natural sources.

6. The biodegradable polyesteretheramide according to claim 1, wherein compound 5 is formed by at least 3 groups of the following: carboxyl, alcohol, furan, amino, ester, amide, anhydride, epoxy, isocyanates, carbodiimides, carbonyl bis caprolactam, oxazolines, including under this designation compounds obtained either from petroleum or from natural sources, particularly compounds which, while containing ether groups in their structure, have active groups capable of reacting in the reaction mixture to form amide groups.

7. The biodegradable polyesteretheramide according to claim 1, wherein compound 5 is a polyether amine with at least 3 amino groups capable of reacting with one or several types of the active groups present in the reaction mixture.

8. The biodegradable polyesteretheramide according to claim 1, wherein compound 6 is formed by elements of the group: isocyanates, carbonyl bis caprolactam, oxazolines, epoxy, carbodiimides, anhydride, including under this designation compounds obtained either from petroleum or from natural sources.

9. The biodegradable polyesteretheramide according to claim 1, wherein compound 7 belongs to the group formed by: diacids, diols, hydroxycarboxylic acids (such as caprolactone), compounds with at least 2 amino groups, amino alcohols (such as ethanol amide, propanolamine . . . ) and cyclic lactams (c-caprolactam, lauryl lactam . . . ), amino acids (such as aminocaproic acid), including under this designation compounds obtained either from petroleum or from natural sources.

10. The biodegradable polyesteretheramide according to claim 1, wherein compound 8 belongs to the group formed by: compounds with metals such as Ti, Ge, Zn, Fe, Mn, Co, Zr, V, Ir, La, Ce, Li and Ca, Sb, organometallic compounds based on these metals, such as salts of organic acids, alkoxides, acetyl acetones.

11. The biodegradable polyesteretheramide according to claim 1, wherein it contains from 0.5 to 10% by weight of polyether amide and from 99.5 to 90% by weight of polyester.

12. A procedure for obtaining a biodegradable polyesteretheramide according to claim 1, comprising a plurality of sequential stages in each of which all or some of the compounds described in claim 1 are added, starting with a stage 1 of temperature adjustment to eliminate the reaction by-products that will be later generated during reaction with lower boiling points, in which the necessary compounds are loaded and a temperature of between 150-210° C. is set inside the reactor, and a pressure of 1000-4000 mbar, to enable the release of volatile products through a distillation column, the stage ending when the column head temperature falls below 65° C.; continuing with a stage 2 of temperature adjustment to eliminate the reaction by-products with higher boiling points, in which all or some of the compounds described in claim 1 are loaded at atmospheric pressure and a temperature of between 150-210° C. is set inside the reactor, and a pressure of 1000-4000 mbar, to enable the release of volatile products through a distillation column, the stage ending when the columns head temperature falls below 100° C.; followed by a stage 3 to eliminate the surplus compound 3, for which the temperature is raised and the pressure is dropped, and a stage 4 in which the pressure is dropped to high vacuum to enhance chain growth, until a number average molecular weight (Mn) of between 5000 and 100000 g/mol is achieved, finishing with a stage 5 in which compound 6 is added on the polymer obtained in stage 4 to achieve greater Mn.

13. The procedure for obtaining a biodegradable polyesteretheramide according to claim 12, wherein in stage 3 the gas outlet is closed, the necessary components are loaded and the temperature is increased to 210-270° C. in the product while a vacuum is initiated by progressively lowering the pressure until it drops below 5 mbar.

14. The procedure for obtaining a biodegradable polyesteretheramide according to claim 12, wherein in stage 5 compound 6 is added to the polymer obtained in stage 4 in the same equipment, adding the melted compound to a mixer incorporated in the line following stage 4, or in a later processing of the pellets obtained in stage 4 using one of the following processes: compounding, injection, extrusion or physical mixture.

15. A method of using the biodegradable polyesteretheramide according to claim 1, comprising providing biodegradable mixtures including, in addition to the polyesteretheramide, compounds chosen from the group formed by aliphatic polyesters, aliphatic-aromatic polyesters, starch, polycaprolactone, cellulose, polyhydroxyalkanoates and polylactic acid.

* * * * *